United States Patent

Greefkes et al.

[15] 3,707,604

[45] Dec. 26, 1972

[54] TELECOMMUNICATION SYSTEM WITH TIME DIVISION MULTIPLEX

[72] Inventors: Johannes Anton Greefkes; Oscar Bernardus Philomenus Rikkert de Koe; Adrianus Wilhelmus Maria van den Enden, all of Emmasingel, Eindhoven, Netherlands

[73] Assignee: U.S. Philips Corporation, New York, N.Y.

[22] Filed: June 22, 1971

[21] Appl. No.: 155,571

[30] Foreign Application Priority Data

June 24, 1970 Netherlands ........................7009245

[52] U.S. Cl. ............................179/15 A, 179/15 BW

[51] Int. Cl. ...............................................H04j 3/04

[58] Field of Search ...............178/50; 179/15 A, 15 AL, 15 BA, 179/15 BS, 15 BW

[56] References Cited

UNITED STATES PATENTS 2,997,545 8/1961 Hartley ..........................179/15 AL 3,492,430 1/1970 Viglianti..........................179/15 AL 3,522,381 7/1970 Feder ................................179/15 A 3,541,524 11/1970 Blasbalg ................................178/50

*Primary Examiner*—Ralph D. Blakeslee

*Attorney*—Frank R. Trifari

[57] ABSTRACT

A telecommunication system with time division multiplex comprising receive transmission lines and send transmission lines and a clock for generating a time scale which is divided into mutually equal frame time intervals, each of which is divided into $k$ mutually equal main time intervals, each of which is divided into $m$ mutually equal sub-time intervals, the transmission lines being divided into groups, and the groups being divided into main groups, each group of receive transmission line being connected to an adjustable first-order multiplexer, the first-order multiplexers of a main group being connected to an adjustable second-order multiplexer, each group of send transmission lines being connected to an adjustable first-order demultiplexer, the first-order demultiplexers of a main group being connected to an adjustable second-order demultiplexer, a switching network being provided for connecting the second-order multiplexers to the second-order demultiplexers. In a preferred embodiment the steepness of the edges and the pulse widths are adapted to the locally prevailing signal pulse frequency.

5 Claims, 5 Drawing Figures

Figure 1:
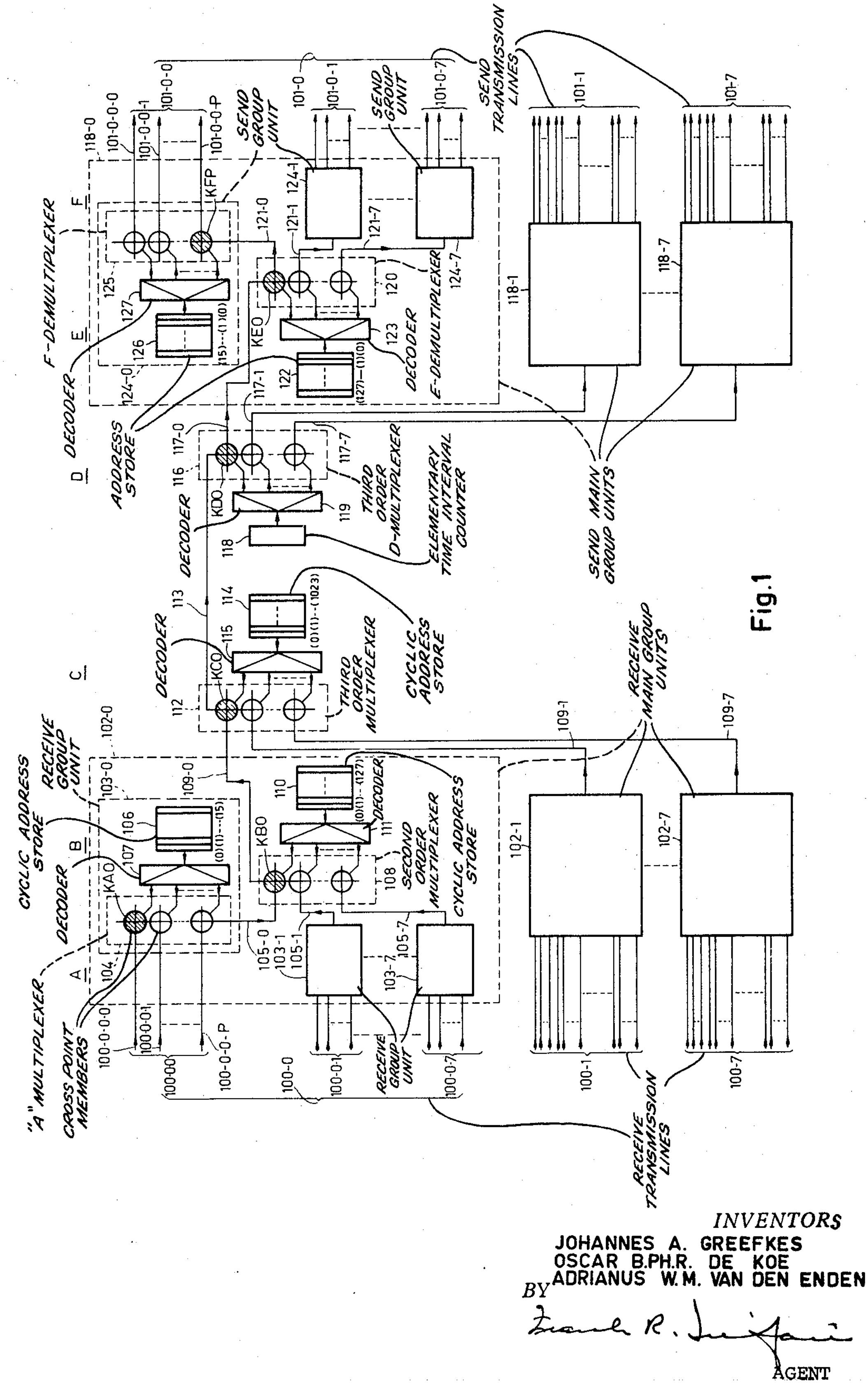

*INVENTORS*
JOHANNES A. GREEFKES
OSCAR B.PH.R. DE KOE
ADRIANUS W.M. VAN DEN ENDEN

BY [signature]
AGENT

INVENTORS
JOHANNES A. GREEFKES
OSCAR B.PH.R. DE KOE
ADRIANUS W.M. VAN DEN ENDEN
BY [signature]
AGENT INVENTORS
JOHANNES A. GREEFKES
OSCAR B.PH.R. DE KOE
ADRIANUS W.M. VAN DEN ENDEN
BY

AGENT

INVENTORS
JOHANNES A. GREEFKES
OSCAR B.PH.R. DE KOE
ADRIANUS W.M. VAN DEN ENDEN
BY [signature]
AGENT INVENTORS
JOHANNES A. GREEFKES
OSCAR B.PH.R. DE KOE
ADRIANUS W.M. VAN DEN ENDEN
BY

AGENT

TELECOMMUNICATION SYSTEM WITH TIME DIVISION MULTIPLEX

The invention relates to a telecommunication system with time division multiplex, comprising receive transmission lines and send transmission lines and a clock for generating a time scale. The time scale is divided into mutually equal frame time intervals, each of which is divided into $k$ mutually equal main time intervals. The receive transmission lines are divided into groups. Each group is connected to an adjustable first-order multiplexer which is controlled by a cyclic address store having $k$ store locations. A variable address can be stored in each store location for establishing in each frame time interval a signal transfer from each receive transmission line of the group to a receive group intermediate highway in a main time interval selectively associated with the receive transmission line and having the same relative position in each frame time interval. The send transmission lines are divided into groups and each group is connected to an adjustable first-order demultiplexer which is controlled by a cyclic address store having $k$ store locations. A variable address can be stored in each of the $k$ store locations for establishing in each frame time interval a signal transfer from a send group intermediate highway to each send transmission line of the group in a main time interval selectively associated with the send transmission line and having the same relative position in each frame time interval.

A telecommunication system of this kind, supplemented with a space-division switching network for connecting the receive group intermediate highways to the send group intermediate highways, is generally known. A connection between a receive transmission line and a send transmission line is established via one or more crosspoints of the switching network which are controlled in the main time interval of each frame time interval that is associated with the connection for establishing a signal transfer.

The invention has for its object to provide a novel concept of the telecommunication system described above in order to achieve a saving in materials and crosspoints.

The telecommunication system according to the invention is characterized in that each of the main time intervals is divided into $m$ mutually equal sub-time intervals, the receive group intermediate high-ways being divided into main groups and each main group being connected to an adjustable second-order multiplexer which is controlled by a cyclic address store having $k.m.$ store locations. A variable address can be stored in each of the $k.\ m.$ store locations for establishing in each main time interval a signal transfer from each receive group intermediate highway of the main group to a receive main group intermediate highway in a sub-time interval selectively associated with the receive group intermediate highway and having the same relative position in each frame time interval. The send group intermediate highways are divided into main groups. Each main group is connected to an adjustable second-order demultiplexer which is controlled by a cyclic address store having $k.m.$ store locations. A variable address can be stored in each of the $k.\ m.$ store locations for establishing in each main time interval a signal transfer from a send main group intermediate highway to each send group intermediate highway of the main group in a sub-time interval selectively associated with the send group intermediate highway and having the same relative position in each frame time interval. A switching network is provided for connecting the receive main group intermediate highways to the send main group intermediate highways.

In this telecommunication system the signals coming from the receive transmission lines of a main group are converted in two stages and in an adjustable manner, into a second-order multiplex signal on a receive main group intermediate highway. The second-order multiplex signal of a send main group intermediate highway is distributed in an analogous manner between the send transmission lines. The number of physical lines which is connected to a multiplexer or a demultiplexer is comparatively small in this telecommunication system so that very high switching frequencies can be used on these intermediate high-ways. As a result, a large saving in materials and crosspoints can be achieved in comparison with a telecommunication system with space-division offering the same connection possibilities.

Figure 2:
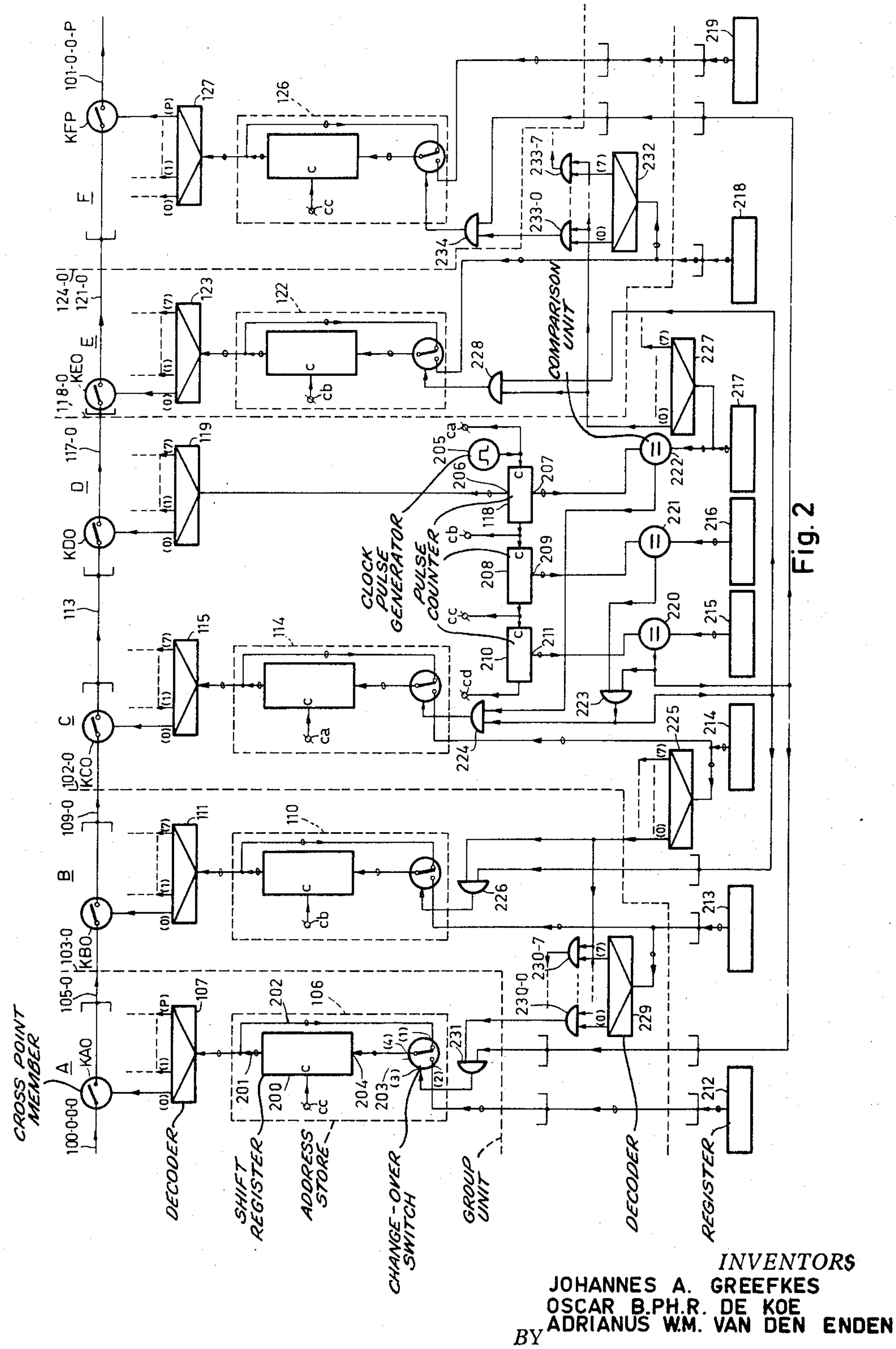
Figure 3:
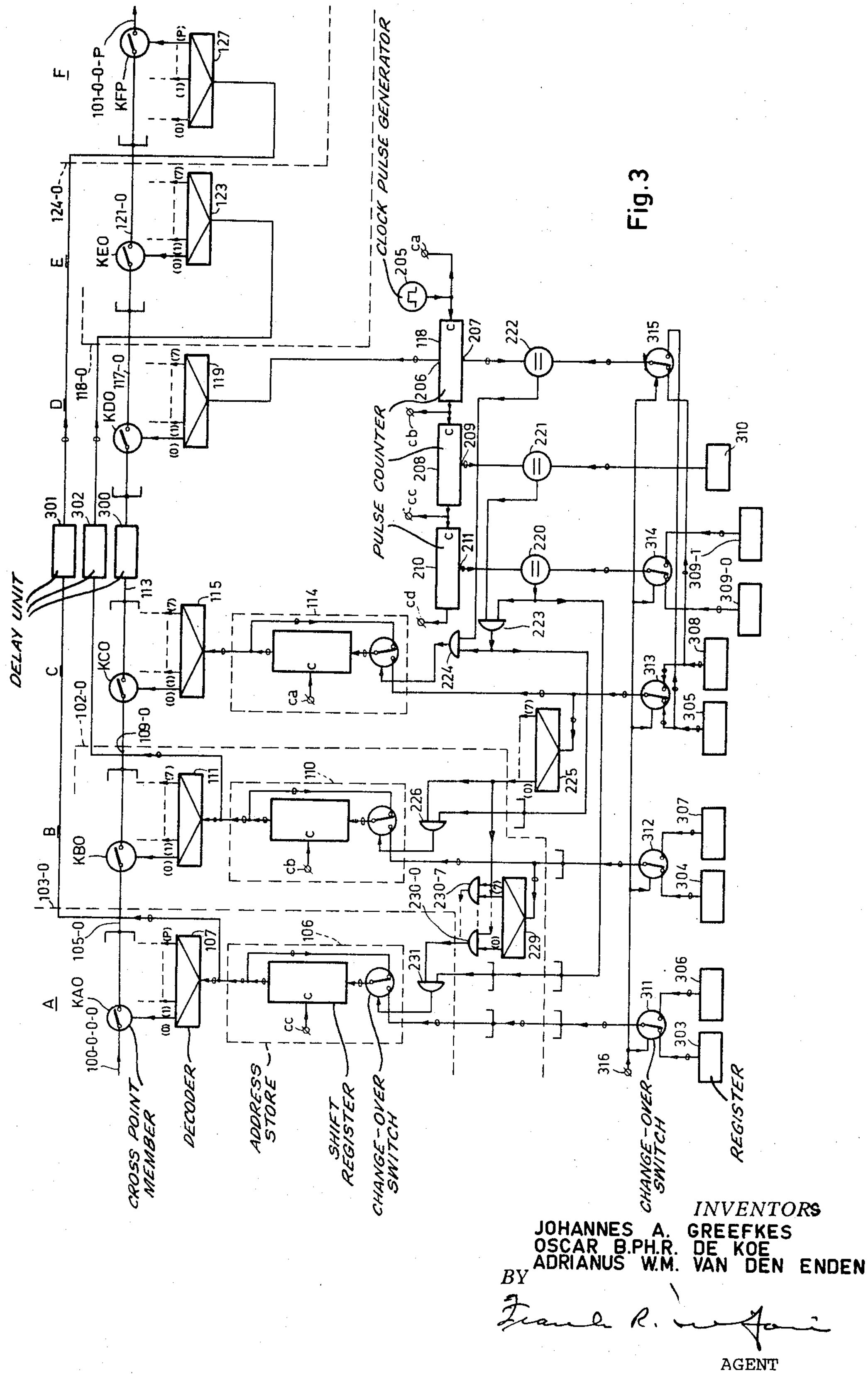
Figure 4:
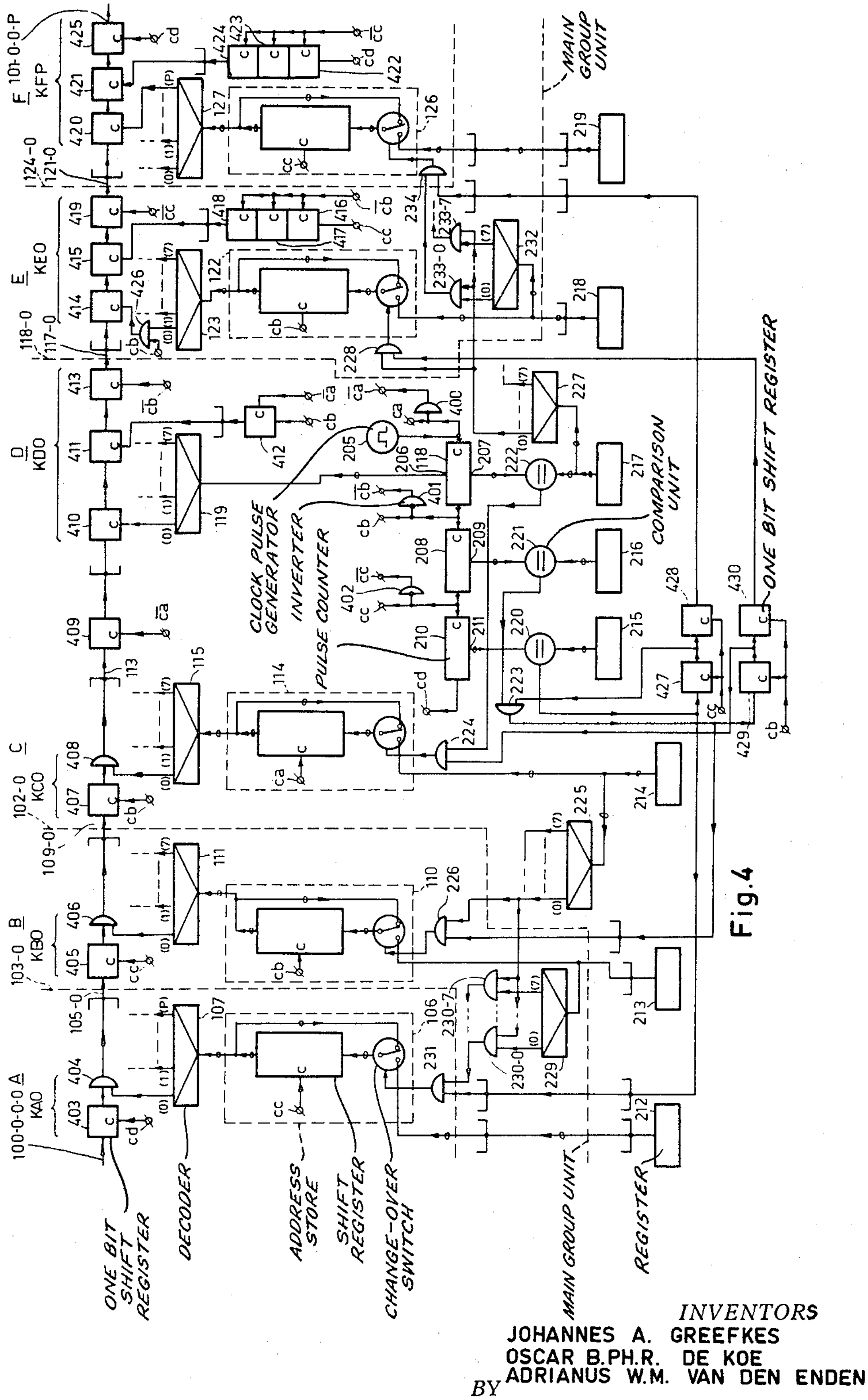
Figure 5:
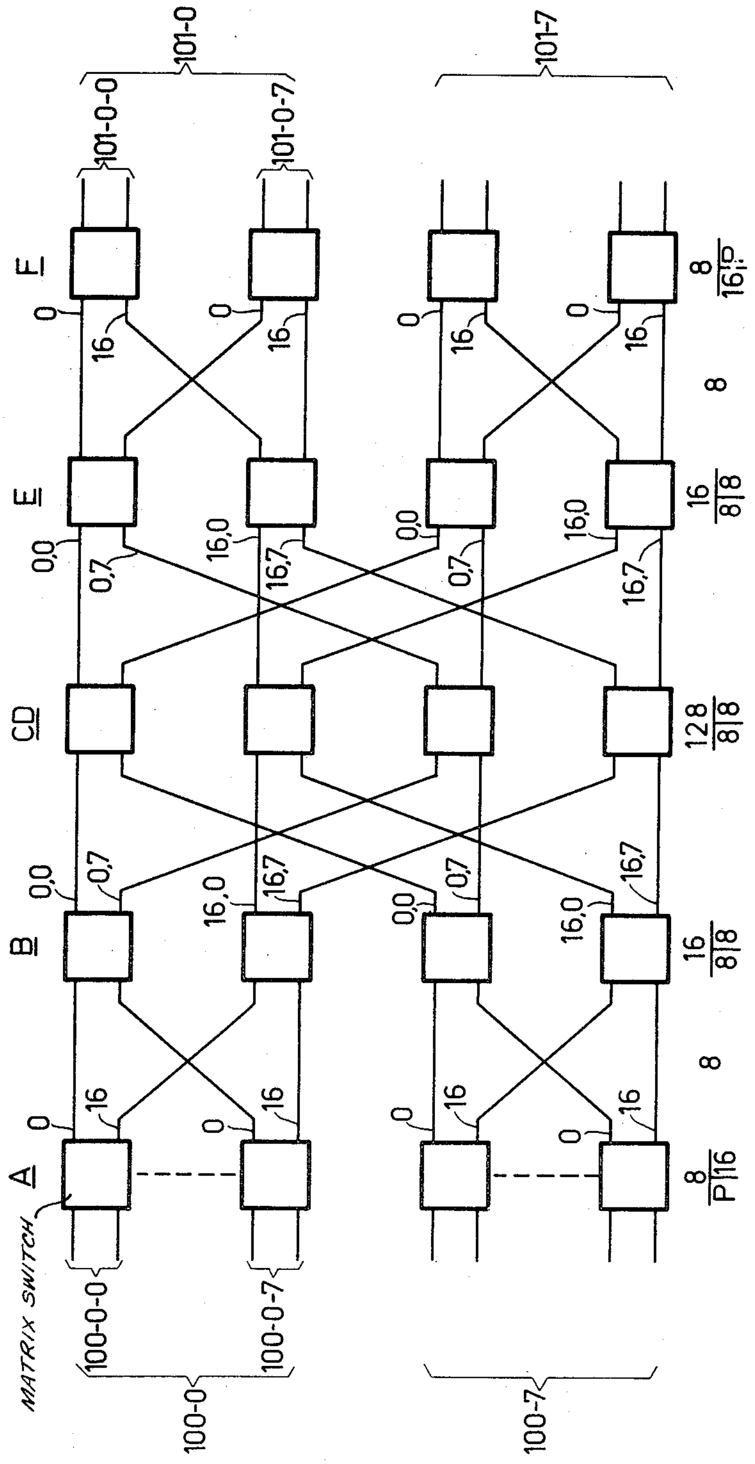

In order that the invention may be readily carried into effect, one embodiment thereof will now be described in detail, by way of example, with reference to the accompanying diagrammatic drawings, in which:

FIG. 1 is a block-schematic diagram of a telecommunication exchange with time division multiplex using the telecommunication system according to the invention, FIG. 2 shows one connection path of the telecommunication exchange shown in FIG. 1, with the means for controlling the crosspoints and for establishing a connection, FIG. 3 shows one connection path of the telecommunication exchange shown in FIG. 1, and the means for controlling the crosspoints and for establishing a four-wire connection, FIG. 4 shows one connection path of the telecommunication exchange shown in FIG. 1 in an embodiment suitable for transfer of digital signals, with the means for controlling the crosspoints and for establishing a connection, FIG. 5 shows a space-division switching network having the same connection possibilities as the telecommunication exchange shown in FIG. 1, Connected to the telecommunication exchange shown in FIG. 1, at the left-hand side in the Figure, are transmission lines for signal transfer in the receive direction and, at the right-hand side in the Figure, transmission lines for signal transfer in the send direction.

The receive transmission lines are divided into the main groups 100–0. 100–1, - - - , 100–7. Each main group is divided into groups, The main group **100–*i*, where $i$= 0.1, - - - , 7, is divided into the groups 100–*i*–0, 100–*i*–1, - - - , 100–*i*–7. In FIG. 1 this is shown only for the case where $i = 0$. The group 100–*i*–*j*, where $i =$ 0, 1, - - - , 7 and $j$ = 0, 1, - - - , 7, comprises the transmission lines 100–*i*–*j*–0, 100–*i*–*j*-1, - - - , 100–*i*–*j*–*p***. In FIG. 1 this is shown only for the case where $i = j = 0$. The number of lines in a group $(p + 1)$ may be arbitrarily chosen. For example, $(p + 1) = 256$ may be chosen. The division of the send transmission lines into main groups and groups is analogous to the division of the receive transmission lines. Each transmission line is thus identified by a line number, a group number and a main group number.

The telecommunication exchange is provided with a clock, not shown in FIG. 1, which generates a time scale. This clock divides the time axis into mutually equal frame time intervals. Each frame time interval is divided into 16 mutual equal main time intervals $t_0$, $t_1$, - - - , $t_{15}$. Each main time interval is divided into eight mutually equal subtime intervals $s_o$, $s_1$, - - - $s_7$ and each sub-time interval is divided into eight mutually equal elementary time intervals $e_o$, $e_1$, - - - , $e_7$.

The transmission lines of the main group 100–0 are connected to the (receive) main group unit 102–0. The main groups 100–1 and 100–7 are connected to the main group units 102–1 and 102–7. The latter are constructed in the same manner as the main group unit 102–0 and are represented in FIG. 1 by blocks.

In main group unit 102–0 the transmission lines of group 100–0–0 are connected to the (receive) group unit 103–0. The groups 100–0–1 and 100–0–7 are connected to the group units 102–1 and 103–7. The latter are constructed in the same way as the group unit 103–0 and are represented in FIG. 1 by blocks.

In group unit 103–0 the transmission lines of group 100–0–0 are connected to the inputs of a first-order multiplex 104, which will hereinafter be referred to as A-multiplexer. The output of A-multiplexer 104 is formed by a line 105–0 which will hereinafter be referred to as AB-intermediate highway.

A-multiplexer 104 comprises crosspoint members for connecting each input to the output. These crosspoint members, represented in the Figure by circles, will hereinafter be referred to as crosspoints. The crosspoints are controlled by a cyclic address store 106 via a decoder 107. The address store 106 has a cycle duration which is equal to the duration of one frame time interval and comprises 16 store locations, in each one of which a line number can be stored. The contents of a store location are supplied to the decoder 107 in each frame time interval in a main time interval having the same relative position in each frame time interval. The line number stored in the store location identified the crosspoint of the receive transmission line and ensures that the cross-point is temporarily closed each time the number is supplied to A-multiplexer 104.

The address store 106 thus divides the transmission time on AB-intermediate highway 105–0 into 16 time channels, each of which is formed by a main time interval having the same relative position in each frame time interval. The store locations are associated with the time channels in a one-to-one relationship. The number of a time channel and the number of the store location associated therewith are given by the number of the main time interval of the time channel. The time channels of an AB-intermediate highway will hereinafter be referred to as AB-channels.

Under the control of the address store 106 each receive transmission line of the group 100–0–0 can be connected to the AB-intermediate highway 105 in the channel intervals of each AB-channel. This is realized by storing the line number of the transmission line in the store location having the same number as the AB-channel.

The AB-intermediate highway 105–0 of group unit 103–0 and the corresponding AB-intermediate highways 105–1 and 105–7 of the group units 103–1 and 103–7 are connected to the inputs of a second-order multiplexer 108 which will hereinafter be referred to as B-multiplexer. Each AB.intermediate highway is identified by the group number and the main group number of the receive transmission lines which are connected to the corresponding group unit. The output of B-multiplexer 108 is formed by a line 109–0 which will hereinafter be referred to as BC-intermediate highway. B-multiplexer 108 comprises a crosspoint between each input and the output. These crosspoints are controlled by a cyclic address store 110 via a decoder 111. The cycle duration of address store 110, like the cycle duration of the address stores yet to be mentioned, is equal to the duration of one frame time interval. The address store 110 comprises 16.8 = 128 store locations, in each one of which a group number can be stored. The contents of a store location are supplied to decoder 111 in each frame time interval in a sub-time interval having the same relative position in each frame time interval. The address store 110 thus divides the transmission time of the BC-intermediate highway 109–0 into 128 time channels, each of which is formed by a sub-time interval having the same relative position in each frame time interval. The store locations are associated with these time channels in a one-to-one relationship. The number of such a time channel and the number of the store location associated therewith is given by the number of the sub-time interval and the number of the main time interval in which the channel interval occurs.

The time channels of the BC-intermediate high-ways will hereinafter be referred to as BC-channels. The operation of a B-multiplexer is analogous to that of an A-multiplexer. Under the control of address store 110 each AB-intermediate highway of the group 105 (105–0, 105–1, - - - , 105–7) can be connected to the BC-intermediate highway 109–0 in the channel intervals of each BC-channel. This is realized by storing the group number of the AB.intermediate highway in the store location having the same number as the BC-channel.

The BC-intermediate highway 109–0 of main group unit 102–0 and the corresponding BC-intermediate high-ways 109–1 and 109–7 of the main group units 102–1 and 102–7 are connected to the inputs of a third-order multiplexer 112, which will hereinafter be referred to as C-multiplexer. Each BC-intermediate highway is identified by the main group number of the receive transmission lines which are connected to the corresponding main group unit. The output of C-multiplexer 112 is formed by the CD-intermediate highway 113. The cross-points of C-multiplexer 112 are controlled by a cyclic address store 114 via decoder 115. The address store 114 comprises 8.128 = 1,024 store locations, in each one of which the main group number of a BO-intermediate highway can be stored. The contents of a store location are supplied to decoder 115 in each frame time interval in an elementary time interval having the same relative position in each frame time interval. The address store 114 thus divides the transmission time of CD-intermediate highway 113 into 1024 time channels, each of which is formed by an elementary time interval having the same relative position in each frame time interval. The store locations are associated with these time channels in a one-to-one relationship. The number of such a time channel and the number of the store location associated therewith is given by the number of the elementary time interval of the time channel, the number of the sub-time interval and the number of the main time interval in which the channel interval occurs. The time channels of the CD-intermediate highway will hereinafter be referred to as CD-channels.

The operation of a C-multiplexer is analogous to that of an A- or B-multiplexer. Under the control of the address store 114 each BC intermediate highway of the group 109 (109–0. 109–1, - - - , 109–7) can be connected to the CD-intermediate highway 113 in the channel intervals of each CD-channel. This is realized by storing the main group number of the BC-intermediate highway in the store location having the same number as the CD-channel.

The CD-intermediate highway 113 is connected to the input of a third-order D-demultiplexer 116. The outputs thereof are formed by the DE-intermediate highways 117–0. 117–1, - - - , 117–7 which are connected to the send main group units 118–0, 118–1, - - - , 118–7. Each DE-intermediate highway is identified by the main group number of the transmission lines which are connected to the corresponding main group unit. The cross-points of D-demultiplexer 116 are controlled by an elementary time interval counter 118 via decoder 119.

In each elementary time interval counter 118 supplies the number thereof to the decoder 119. Each number identifies a particular crosspoint of the D-demultiplexer 116 and, when supplied to the decoder 119, ensures that the crosspoint is temporarily closed.

CD-intermediate highway 113 is thus connected in a cyclic sequence to each DE-intermediate highway of the group 117 (117–0. 117–1, - - - , 117–7). The CD-intermediate highway 113 is then connected to a given DE-intermediate highway in the channel intervals of the CD-channel, the elementary time interval number of which is identical to the main group number of the DE-intermediate highway.

The C-multiplexer 112 and the D-demultiplexer together operate such that each BC-intermediate highway of the main group 109 can be connected to each DE-intermediate highway of the main group 117 in the channel intervals of each CD-channel, the elementary time interval number of which is identical to the main group number of the DE-intermediate highway.

The main group units 118–1 and 118–7 are constructed in the same way as the main group unit 118–0 and are represented in FIG. 1 by blocks.

In main group unit 118–0 the DE-intermediate highway 117–0 is connected to the input of a second-order E-demultiplexer 120. The outputs thereof are formed by the EF-intermediate highways 121–0, 121–1, - - - , 121–7 which are connected to the send group units 124–0, 124–1, - - - , 124–7. Each EF-intermediate highway is identified by the group number and the main group number of the transmission lines which are connected to the corresponding group unit.

The crosspoints of E-demultiplexer 120 are controlled by a cyclic address store 122 via the decoder 123. The address store 122 has 128 store locations, in each of which the group number of an EF-intermediate highway can be stored. The contents of a store location are supplied to decoder 123 in each frame time interval in a sub-time interval having the same relative position in each frame time interval. The address store thus divides the transmission time of DE-intermediate highway 117–0 at the receive side into 128 time channels, each of which is formed by a sub-time interval having the same relative position in each frame time interval. The store locations are associated with these time channels in a one-to-one relationship. The number of such a time channel and the number of the store location associated therewith is given by the number of the sub-time interval of the time channel and the number of the main time interval in which the channel interval occurs. The time channels of DE-intermediate highway will hereinafter be referred to as DE-channels.

Under the control of the address store 122 the DE-intermediate highway 117–0 can be connected to each EF-intermediate highway of the group 121 (121–0, 121–1, - - - , 121–7) in the channel intervals of each DE-channel. This is realized by storing the group number of the DE-intermediate highway in the store location associated with the DE-channel.

The group units 124–1 and 124–7 are constructed in the same way as the group unit 124–0 and are represented in FIG. 1 by blocks.

In group unit 124–0 the EF-intermediate high-way 121–0 is connected to the input of a first-order F-demultiplexer 125. The outputs thereof are formed by the send transmission lines 101–0–0–0, 101–0–0–1, - - - , 101–0–0–P.

The crosspoints of F-demultiplexer 125 are controlled by a cyclic address store 126 via the decoder 127. The address store 126 has 16 store locations, in each of which the line number of a send transmission line can be stored. The contents of a store location are supplied to decoder 127 in each frame time interval in a main time interval having the same relative position in each frame time interval. The address store thus divides the transmission time of EF-intermediate highway 121–0 at the receive side into 16 time channels, each of which is formed by a main time interval having the same relative position in each frame time interval. The store locations are associated with these time channels in a one-to-one relationship. The number of such a time channel and the number of the store location associated therewith is given by the number of the main time interval of the time channel. The time channels of an EF-intermediate highway will hereinafter be referred to as EF-channels.

Under the control of the address store 126 the EF-intermediate highway 121–0 can be connected to each transmission line of the group 101–0–0 in the channel intervals of each EF-channel. This is realized by storing the line number of the transmission line in the store location which is associated with the EF-channel.

The A-multiplexers of all receive group units form the A-switching stage of the telecommunication exchange. The B-multiplexers of all receive main group units form the B-switching stage. The C-multiplexer and the D-demultiplexer together form the CD-switching stage. The E-demultiplexers of all send main group units form the E-switching stage and the F-demultiplexers of all send group units form the F-switching stage. The telecommunication exchange thus comprises five switching stages, in each of which a choice can be made between a number of channels departing from the switching stage for each channel arriving at the switching stage.

The switching network of the telecommunication exchange shown in FIG. 1 has the same connection possibilities between the receive and send transmission lines as the space-division five stage switching network shown in FIG. 5. In this Figure each block represents a matrix switch comprising a number of inputs, a number of outputs and means for connecting each input to each output. The indication below the A-switching stage means that each group of matrix switches of this switching stage comprises eight matrix switches, each of which is provided with P inputs and 16 outputs. The indications below the other switching stages have a corresponding meaning. Between the indications below the A-and the B-switching stage and the indications below the E- and the F-switching stage, the number of groups of matrix switches of these switching stages is given. The CD-switching stage comprises one group of 128 matrix switches.

The intermediate lines interconnecting the switching stages shown in FIG. 5 are associated in a one-to-one relationship with the time channels of the intermediate highways connecting the corresponding switching stages of the telecommunication exchange shown in FIG. 1.

In the described embodiment of the telecommunication exchange the channel intervals become narrower proceeding from the A-switching stage to the CD-switching stage and the channel intervals become wider proceeding from the CD-switching stage to the F-switching stage. The narrowest channel intervals occur in the CD-switching stage. The embodiment of the CD-switching stage shown in FIG. 1 is the time-division equivalent of a space-division switching stage having the same number of inputs and the same number of outputs. In the space-division embodiment 8 × 8 crosspoints are required instead of the 8 + 8 crosspoints required in the embodiment shown in FIG. 1. For the control of these 8 × 8 crosspoints eight cyclic stores of 128 store locations each are required instead of one cyclic store having 1,024 store locations and a counter. In the embodiment of the space-division CD-switching stage the narrowest channel intervals are sub-time intervals. The connection possibilities of the CD-switching stage are the same in both cases.

The physical connection between a receive transmission line and a send transmission line extends via the AD-intermediate highway of the group unit of the receive transmission line, the BC-intermediate highway of the main group unit of the receive transmission line, the CD-intermediate highway, the DE-intermediate highway of the main group unit of the send transmission line and the EF-intermediate highway of the group unit of the send transmission line. A time-derived connection between the receive transmission line and the send transmission line extends via a time channel of each of the intermediate highways of the physical connection between these two transmission lines. This time-derived connection is fully determined by the choice of two numbers *x* and *y*. The main group number of the send transmission line is denoted by *z*. Contrary to *x* and *y*, *z* is fixed for each connection. The three numbers *x*, *y* and *z* together determine which time channels are eligible for the connection. The number of a time channel consists of one, two or three numbers. The same applies to the store location which is associated with the time channel. The number of a time channel is written with the main time interval number in front, followed, if applicable, by the sub-time interval number which is followed if applicable, by the elementary time interval number, the numbers being separated by commas.

For the physical intermediate lines of the switching network shown in FIG. 5, the same numbering can be used as for the corresponding time channels of the telecommunication exchange shown in FIG. 1. This has been done in FIG. 5 for the intermediate highways shown therein.

If the transfer of a signal from a receive transmission line to a send transmission line is effected without delay, the time-derived connection is established via the time channels:

AB-channel *x*,
BC-channel *x*, *y*,
CD-channel *x*, *y*, *z*
DE-channel *x*, *y*
EF-channel *x*, The establishment of such a time-derived connection without time delay will be described with reference to FIG. 2. In the upper portion of FIG. 2 one physical connection path of the telecommunication exchange shown in FIG. 1 is shown. Chosen is, by way of example, the physical connection path extending via the crosspoints KAO, KBO, KCO, KDO, KEO and KFP which are indicated by shading in FIG. 1. This is the physical connection path between the receive transmission line 100–0–0–0 and the send transmission line 101–0–0b–P.

A time-derived connection, characterized by the numbers *x*, *y* and *z*, between the receive transmission line 100–0–0–0 and the send transmission line 101–0–0–P exists if:

1. the line number of the receive transmission line is stored in store location *x* of the address store 106 of the relevant group unit 103–0.
2. the group number of the receive transmission line is stored in store location *x*, *y* of the address store 110 of the relevant main group unit 102–0.
3. the main group number of the receive transmission line is stored in the store location *x*, *y*, *z* of the address store 114 (in the example *z* = 10).
4. the group number of the send transmission line is stored in the store location *x*, *y* of the address store 122 of the relevant main group unit 118–0.
5. the line number of the send transmission line is stored in the store location *x* of the address store 126 of the relevant group unit 124–0.

The result of the above operations is (same order as above):

1. that the receive transmission line is connected to the AB-intermediate highway 105–0 of the relevant group unit 103–0 in the channel intervals of AB-channel *x*.

2. that the AB-intermediate highway 105–0 of the relevant group unit is connected to the BC-intermediate highway 109–0 of the relevant main group unit 102–0 in the channel intervals of BC-channel $x$, $y$, so that AB-channel $x$ is connected to BC-channel $x$, $y$.
3. that the BC-intermediate highway 109–0 of the relevant main group unit 102–0 is connected to the DE-intermediate highway 117–0 of the relevant main group unit 118–0 in the channel intervals of CE-channel $x$, $y$, $z$ ($z=0$), so that BC-channel $x$, $y$ is connected to DE-channel $x$, $y$.
4. that the DE-intermediate highway 117–0 of the relevant main group unit 118–0 is connected to the EF-intermediate highway 121–0 of the relevant group unit 124–0 in the channel intervals of DE-channel $x$, $y$, so that DE-channel $x$, $y$ is connected to EF-channel $x$.
5. that the EF-intermediate highway of the relevant group unit 124–0 is connected to the send transmission line 101–0–0–P in the channel intervals of the EF-channel $x$.

In FIG. 2 the parts corresponding to FIG. 1 are denoted by the same reference signs. The crosspoints KAO, KBO, KCO, KDO, KEO and KFP of FIG. 1 are represented in FIG. 2 by physical contacts symbolizing the switching function of the crosspoints. Suitable embodiments in which, in addition to the switching function a signal regeneration function is realized, will be described hereinafter with reference to FIG. 4.

In the control portion of the exchange use is made exclusively of digital signals having two possible voltage levels which correspond to the logical states 0 and 1. A clock pulse has a level corresponding to that of the logical state 1, the level of the clock pulse interval corresponding to that of the logical state 0.

In the embodiments use is made of synchronous counters, shift registers, decoders, comparison units, AND-gates and OR-gates. The specification of their operation in reaction to the supply of logical signals and/or clock pulses gives sufficient information to enable their realization in some system of logical circuit elements.

The synchronous counters and shift registers have the same general operation as a JK flip-flop of the master-slave type. During the logical voltage level 1 of the clock pulse the master flip-flops are set according to a logical state combination which is externally applied or is internally generated, and the slave or output flip-flops are set by the information from the master flip-flops during the trailing edge of the clock pulse. The clock input of a counter or shift register is denoted in the Figures by C.

A group of parallel lines which are used for transferring a character or other code word in a parallel form is represented in the Figures by a circumscribed line.

The direction of the information transport is indicated in the Figures by arrows in the lines. The connection of a line to a circuit forms an input if the arrow points towards the symbol of the circuit, and forms an output in the reverse case. The connection of a group of parallel lines forms a multiple input or multiple output, respectively.

The address stores 106, 110, 114, 122 and 126 as shown in FIG. 2, all have the same construction, they differ only as regards the number of store locations. The address store 106 comprises a shift register 200 having 16 store locations, in each of which an address or number can be stored. The shift register is controlled on the clock input by the clock pulses $cc$, which occur once every main time interval. The output 201 of the shift register is a multiple output on which the addresses stored in the store locations of the shift register are each presented in a parallel form in a cyclic sequence in main time intervals. The output 201 forms the output of the cyclic store 106. The output 201 is connected via a multiple return line 202 to the input (1) of a change-over switch 203, the output (4) of which is connected to the input 204 of the shift register 200. The input (2) of change-over switch 203 forms the address input of the address store 106. The control input (3) of change-over switch 203 forms the control input of the address store 106. The change-over switch 203 is a multiple switch via which an address can be transferred in a parallel form. The representation by a single physical change-over contact merely serves to symbolize the switching function.

Change-over switch 203 normally will connect input (1) to the output (4), so that an address which is presented on the output 201 is returned to the input 204 and the addresses continue to circulate through the address store. When the logical voltage level 1 is supplied to the control input (2), the change-over switch 203 is set to the other position. In this position the address supplied to the address input of address store 106 will be stored in the shift register 200 and the address appearing on the output 201 will be erased.

The address store 126 is identical to the address store 106. The address stores 110 and 122 are also identical. The shift registers of the latter address stores have 128 store locations and are controlled by the clock pulses $cb$ occurring once every sub-time interval. The shift register of address store 114 has 1024 store locations and is controlled by the clock pulses $ca$ occuring once every elementary time interval.

The telecommunication exchange shown in FIG. 2 comprises a clock pulse generator 205 supplying an equidistant sequence of clock pulse $ca$. The periods of these clock pulses determine the elementary time intervals. The clock pulses $ca$ are supplied to a clock pulse output $ca$ and to the clock input of a modulo-8 pulse counter 118. This counter has a cycle of eight clock pulse periods. Counter 118 has two multiple outputs 206 and 207, on each of which the numbers of the elementary time intervals are presented in a binary code and in a parallel form. The output 206 is connected to the decoder 119 of D-demultiplexer 116. One output of counter 118, the logical voltage level of which changes from 1 to 0 once every cycle, is connected to a clock pulse output $cb$ and to the clock pulse input of a modulo-8 pulse counter 208. On the clock pulse output $cb$ an equidistant sequence of clock pulses $cb$ occurs, the periods of which determine the sub-time intervals. Counter 208 has a cycle of eight clock pulse periods of the clock pulses $cb$. The numbers of the sub-time intervals are presented in a binary code and in a parallel form on the multiple output 209. One output of counter 208, the logical voltage level of which changes from 1 to 0 once every cycle, is connected to a clock pulse output $cc$ and to the clock pulse input of a modulo-16 pulse counter. On the clock pulse output *cc* an equidistant sequence of clock pulses *cc* occurs, the periods of which determine the main time intervals.

Counter 210 has a cycle of 16 clock pulse periods of the clock pulse *cc*. The numbers of the main time intervals are represented in a binary code and in a parallel form on multiple output 211. One output of counter 210, the logical voltage level of which changes from 1 to 0 once every cycle, is connected to a clockpulse output *cd*. On this clock pulse output an equidistant sequence of clock pulses *cd* appears, the periods of which determine the frame time intervals.

The arrangement for establishing a connection shown in FIG. 2 comprises a number of registers for the temporary storage of the numbers which are to be stored in the address in order to establish a connection. For each register the nature of the number to be stored therein is given in the below table.

TABLE 1

| register | nature of the number |
|---|---|
| 212 | line number of the receive transmission line |
| 213 | group number of the receive transmission line |
| 214 | main group number of the receive transmission line |
| 215 | $x$ |
| 216 | $y$ |
| 217 | main group number of the send transmission line ($z$) |
| 218 | group number of the send transmission line |
| 219 | line number of the send transmission line |

The outputs of these registers are connected in accordance with the below Table.

TABLE 2

| register | connection |
|---|---|
| 212 | the address inputs of the address stores of all A-multiplexers. |
| 213 | the address inputs of the address stores of all B-multiplexers and to a decoder **229** for each receive main group unit. |
| 214 | the address input of the address store of the C-multiplexer and to a decoder **225**. |
| 215 | a comparison unit **220**, the other side of which is connected to the output **211** of main time interval counter **210**. |
| 216 | a comparison unit **221**, the other side of which is connected to the output **209** of sub-time interval counter **208**. |
| 217 | a comparison unit **222**, the other side of which is connected to the output **207** of elementary time interval counter **118**, and to a decoder **227**. |
| 218 | the address inputs of the address stores of all E-demultiplexer and to a decoder **232** for each send main group unit. |
| 219 | the address inputs of the address stores of all F-demultiplexers. |

A comparison unit produces the logical voltage level 1 on the output if the number supplied to the comparison unit by the counter is the same as the number supplied to the comparison unit by the register. Comparison unit 220 produces a signal having the logical voltage level 1 in each frame time interval in the main time interval $x$. The outputs of the comparison units 220 and 221 are connected to the inputs of an AND-gate 223. The latter supplies a signal having in each frame time interval the logical voltage level 1 in the sub-time interval $y$ of the main time interval $x$. The output of AND-gate 223 and the output of comparison unit 222 are connected to the inputs of an AND-gate 224. The latter supplies a signal having in each frame time interval the logical voltage level 1 in the elementary time interval $z$ of the sub-time interval $y$ of the main time interval $x$.

A time derived connection between the receive transmission line 100–0–0–0 and the send transmission line 101–0–0–P is established as follows. (In this example $z=0$).

The output of AND-gate 224 is connected to the control input of the address store 114. As a result, the number of register 214 is stored in the location $x, y, z$ of address store 114.

Connected to the multiple output of register 214 is a decoder 225. The latter has eight outputs (0), - - - , (7) which are connected to the receiver main group units. Output (0) is connected in main group unit 102–0 to an input of an AND-gate 226, a second input of which is connected to the output of AND-gate 223. The output of AND-gate 226 is connected to the control input of the address store 110. Decoder 225 decodes the main group number stored in register 214. In the example, this is the number of main group 100–0. In this case the output (0) of decoder 225 has the logical voltage level 1. The AND-gate 226 will then have the logical voltage level 1 in the sub-time interval $y$ of the main time interval $x$. As a result, the number of register 213 is stored of the address store 110 of main group unit 102–0 in the location $x$, $y$. In a completely analogous manner the decoder 227, in conjunction with the AND-gate 228 of main group unit 118–0, ensures that the number of register 218 is stored in the location $x$, $y$ of the address store 122.

Connected to the output of register 213 is in each main group unit a decoder. In main group unit 102–0 this is the decoder 229. The latter has eight outputs (0), - - - , (7), an input of an individual AND-gate 230–0, - - - , 230–7 being connected to each of them. A second input of each of these AND-gates is connected to the output (0) of decoder 225. The outputs of the AND-gates are connected to the group units of the relevant main group unit. The output of AND-gate 230–0 is connected in group unit 103–0 to an input of an AND-gate 231, a second input of which is connected to the output of comparison unit 220. The output of AND-gate 231 is connected to the control input of the address store 106. Decoder 229 decodes the group number stored in register 213. In the example, this is the number of group 100–0–0. In this case output (0) has the logical voltage level 1. As in the example the output (0) of decoder 225 also has the logical signal level 1, the output of AND-gate 230–0 will have the logical signal level 1. The output of AND-gate 231 will then have the logical voltage level 1 in the main time interval $x$. As a result, the number of register 212 will be stored in the location $x$ of the address store 106. In a completely analogous manner the decoder 232 of main group unit 118–0 and the AND-gates 233–0, - - - , 233–7 connected thereto, in conjunction with AND-gate 234 of group unit 124–0 and output (0) of decoder 227, ensure that the number of register 219 is stored in the store location No. $x$ of the address store 126.

After the numbers of the registers 212, - - - , 219 have been transferred to the address stores, which transfer has taken place no later than one frame time interval after introduction of the numbers into these registers, the output signals of the comparison units 220, 221 and 222 are suppressed in a manner not described and the registers can be erased.

The time-derived connection between a receive and a send transmission line makes it possible to transfer signal samples having a repetition frequency which is equal to the frame repetition frequency from the receive to the send transmission line. This is accompanied by damping as the energy present in the signal samples constitutes only a small portion of the total signal energy. This damping can be eliminated by using amplifiers.

The following description is based on a telecommunication exchange of the type shown in FIG. 1 to which four-wire transmission paths are connected, the object being the establishment of four-wire connections, each consisting of a separate go-connection path and a return-connection path, between these transmission paths.

Each four-wire transmission path is terminated by a receive and a send transmission line having the same line, group and main group number. The go-connection path extends from the receive transmission line of the calling or A-transmission path to the send transmission line of the called or B-transmission path. The return-connection path extends from the receive transmission line of the B-transmission path to the send transmission line of the A-transmission path.

A go and a return connection path can be established individually as described above. A simplification of the control of the crosspoints can be realized by permanently associating the return-connection path with the go-connection path. Assuming that $z_1$ is the main group number of the A-transmission path and also assuming that $z_2$ is the main group number of the B-transmission path, the time channels of the go-connection path are fully determined by $x$, $y$ and $z_2$ and the time channels of the return-connection path are fully determined by $x'$, $y'$ and $z_1$. Generally, $x$, $y$, $x'$ and $y'$ can be determined arbitrarily. The following description is based on the case that the return-connection path is permanently associated with the go-connection path by the relations $x' = x + 8$ and $y' = y$.

The number of a main time interval cannot exceed the value 15 so that $x + 8$ is to be read as $(x + 8)$ modulo 16. The number of a sub-time interval and of an elementary time interval cannot exceed the value 7. Therefore, the following notations will be adhered to hereinafter.

1. Time channel $x$ is to be read as time channel $x$ modulo 16.
2. Time channel $x, y$ is to be read as time channel $(x + \text{entier } y/8)$ modulo 16, $y$ modulo 8.
3. Time channel $x, y, z$ is to be read as time channel $(x + \textit{entier } (y + \text{entier } z/8)/8)$ modulo 16, $(y + \textit{entier } z/8)$ modulo 8, $z$ modulo 8

Herein entier a fraction is the integer part to the left of the decimal point of the corresponding decimal fractional number. The same is applicable to the numbers of the store locations of the cyclic address stores.

A go-connection path and a return-connection path associated with each other as described above will be referred to as a symmetrical four-wire connection. Controlling the crosspoints of such a four-wire connection and establishing such a four-wire connection will be described with reference to an embodiment shown in FIG. 3.

In the upper portion of FIG. 3 the physical connection path of FIG. 2 is shown, a delay unit 300 being inserted in the CD-intermediate highway 113. In FIG. 3 the parts corresponding with FIG. 2 are denoted by the same reference signs. The crosspoints in the A-, B-, C- and D-switching stage are controlled in the same way and by the same means (decoders and address stores) as in FIG. 2. The control of the cross-points in the E- and F-switching stage is effected in a slightly different manner. In the case of FIG. 3 the crosspoints of the E-switching stage are controlled from the address stores of the B-switching stage and the crosspoints of the F-switching stage are controlled from the address stores of the A-switching stage. This is realized as follows. The output of the address store of each receive group unit is connected via a delay unit to the decoder of the corresponding send group unit. The output of the address store of each receive main group unit is connected via a delay unit to the decoder of the corresponding send main group unit. FIG. 3 shows the connection between the output of address store 106 of group unit 103–0 and the decoder 127 of group unit 124–0, in which connection the delay unit 301 is incorporated. Also shown in the connection between the output of address store 110 of main group unit 102–0 and the decoder 123 of main group unit 118–0, in which connection the delay unit 302 is incorporated. The delay units 301 and 302 have the same delay time, which is one half frame time interval larger than the delay time of delay unit 300.

The device for establishing a go-and return-connection path as shown in FIG. 3 comprises the registers given in the below Table 3 for storing the numbers stated adjacently.

TABLE 3

| register | nature of the number |
|---|---|
| 303 | line number of the A-transmission path |
| 304 | group number of the A-transmission path |
| 305 | main group number of the A-transmission path ($z_1$) |
| 306 | line number of the B-transmission path |
| 307 | group number of the B-transmission path |
| 308 | main group number of the B-transmission path($z_2$) |
| 309-0 | $x$ |
| 309-1 | $x + 8$ |
| 310 | $y$ |

A four-wire connection is established in two phases while using corresponding means as shown in FIG. 2 for storing the numbers of a receive transmission line in the address stores of the A-, B- and CD-switching stage. These corresponding means are shown in FIG. 3, the same reference signs being used as in FIG. 2. In the case of FIG. 3, these means are connected to the outputs of the change-over switches 311, - - - , 315 and the output of register 310 instead of to the registers 212, - - - , 217 as in FIG. 2. In phase 1 the change-over switches are in the position shown and in phase 2 the change-over switches are in the other position. The below table indicates which registers are switched on in the two phases, and also to which register of FIG. 2 the switched-on register corresponds.

TABLE 4

| phase 1 | phase 2 | FIG. 2 |
|---|---|---|
| 303 | 306 | 212 |
| 304 | 307 | 213 |
| 305 | 308 | 214 |
| 309-0 | 309-1 | 215 |
| 310 | 310 | 216 |
| 308 | 305 | 217 |

As an example is taken a four-wire connection between the A-transmission path, which is terminated by the receive transmission line 100–0–0–0 and the send transmission line 101–0–0–0, and the B-transmission path which is terminated by the receive transmission line 100–0–0–P and the send transmission line 101–0–0b–P.

From the tables 3 and 4 and the description of FIG. 3 it follows that, after completion of two establishment phases, each of which need not last longer than one frame time interval, the following has occurred:

1. the line number of the A-transmission path has been stored in the location $x$ of the address store 106 of the relevant group unit 103–0.
2. the line number of the B-transmission path has been stored in the location $x+8$ of the address store 106 of the relevant group unit 103–0.
3. the group number of the A-transmission path has been stored in the location $x, y$ of the address store 110 of the relevant main group unit 102–0.
4. the group number of the B-transmission path has been stored in the location $x+8, y$ of the address store 110 of the relevant main group unit 102–0.
5. the main group number of the number of the A-transmission path has been stored in the location $x, y, z_2$ of the address store 114.
6. The main group number of the B-transmission path has been stored in the location $x+8, y, z_1$ of the address store 114.

The inclusion of the delay unit 300 in the CD-intermediate highway 113 influences the numbers of the CD-channel (after the delay), the DE-channel and the EF-channel of a time-derived connection. Assuming that the delay unit 300 causes a delay of $u$ main time intervals, $v$ sub-time intervals and $w$ elementary time intervals and also assuming that the time-derived connection is again characterized by the numbers $x$, $y$ and $z$, the time-derived connection will extend via the time channels:

| | |
|---|---|
| AB-channel | $x$ |
| BC-channel | $x, y,$ |
| CD-channel | $x, y, z$ |
| (after the delay) | $x+u, y+v, z+w$ |
| DE-channel | $x+u, y+v$ |
| EF-channel | $x+u$ |

For the present purposes $v=w=0$ and $u=0$ or $u=8$ suffice. In the former case delay unit 300 causes zero delay and the delay units 301 and 302 cause a delay of one half frame time interval. In the second case delay unit 300 causes a delay of one half frame time interval and the delay units 301 and 302 cause a delay of one frame time interval. The following description refers to an arbitrary (integral) value of $u$. The delay units 301 and 302 have a delay of $u+8$ main time intervals.

The go-connection path is characterized by the numbers $x$, $y$ and $z_2$ and will extend via the time channels:

| | |
|---|---|
| AB-channel | $x$ |
| BC-channel | $x, y$ |
| CD-channel | $x, y, z_2$ |
| (after the delay | $x+u, y, z_2$ |
| DE-channel | $x+u, y$ |
| EF-channel | $x+u$ |

The AB- and the BC-channel are time channels of the group unit and the main group unit, respectively, of the A-transmission path. The DE- and the EF-channel are time channels of the main group unit and the group unit, respectively, of the B-transmission path.

The return-connection path is characterized by the numbers $x+8$, $y$ and $z_1$ and will extend via the time channels:

| | |
|---|---|
| AB-channel | $x+8$ |
| BC-channel | $x+8, y$ |
| CD-channel | $x+8, y, z_1$ |
| (via the delay) | $x+u+8, y, z_1$ |
| DE-channel | $x+u+8, y$ |
| EF-channel | $x+u+8.$ |

The AB- and the BC-channel are time channels of the group unit and the main group unit, respectively, of the B-transmission path. The DE- and the EF-channel are time channels of the main group unit and the group unit, respectively, of the A-transmission path.

As a result of the described connections between the address stores of the A- and the B-switching stage and the decoders of the F- and the E-switching stage, the store location $x$ of the address store of each receive group unit, which is associated with AB.channel $x$, is also associated with the EF-channel $x+u+8$ of the corresponding send group unit, and the store location $x+8$, which is associated with AB-channel $x+8$, is also associated with the EF-channel $x+8+u+8=x+u$ of the corresponding send group unit.

Furthermore, the store location $x, y$ of the address store of each receive main group unit, which is associated with BC-channel $x, y$, is also associated with the DE. channel $x+u+8, y$ of the corresponding send main group unit, and the store location $x+8, y$, is also associated with the DE-channel $x+8+u+8, y=x+u, y$ of the corresponding send main group unit.

The result of the established connections mentioned above in points 1., 3. and 5. is the establishment of the first portion of the go-connection path comprising the first three time channels thereof and of the second which is BC-channel $x+8, y$ is also associated with the DE-channel *portion of the return-connection path comprising the last two time channels thereof. The result of the established connections mentioned above in the points* 2., 4. and 6. is the establishment of the first portion of the return-connection path and of the last portion of the go-connection path.

In the example, in which the A- and the B- transmission path belong to the same group of the same main group, the physical connection paths of two time-derived connections comprise the same intermediate high-ways.

The line number of the A-transmission path is decoded by decoder 107 in the channel intervals of AB-channel $x$ and by decoder 127 in the channel intervals of EF-channel $x+8+u$. The line number of the B-transmission path is decoded by decoder 107 in the channel intervals of AB-channel $x+8$ and by decoder 127 in the channel intervals of EF-channel $x+u$. If $u=8$ is chosen, the decoders 107 and 127 will decode the same line number simultaneously. In this case the decoders 107 and 127 may be combined to form one decoder controlling both the crosspoints of the A-multiplexer and the crosspoints of the F-demultiplexer. For analogous reasons, the decoders 111 and 123 may be combined in the case that $u+8$.

In the case that $u=8$, the delay units 301 and 302 may be omitted as a delay of one frame time interval has the same effect here as zero delay.

As an alternative for the delay units 301 and 302, in the case that $u=0$, the connection with the decoders of the F- and E-demultiplexers can be established from a center branch of the shift registers of the address stores of the A- and B-multiplexers.

In the telecommunication exchange described thus far the time in which a receive transmission line is connected to a send transmission line is limited in each frame time interval to one elementary time interval.

This brief connection time is achieved in two stages via a main time interval in switching stage A and a sub-time interval in switching stage B. In two further stages the connection time is increased again via one subtime interval in switching stage E and one main time interval in switching stage F.

This stage-wise reduction and increase of the connection time is accompanied by an increase and a decrease, respectively, of the frequency at which signal pulses are transferred. For technical reasons it is advantageous to adapt the steepness of the edges of the signal pulses to the pulse frequency occurring locally. This means that from the A-switching stage to the CD-switching stage, where the connection time i.e. the pulse duration decreases, the steepness of the edges is to be increased. On the other hand, this also means that from the CD-switching stage to the F-switching stage, where the connection time increases, the steepness of the edges slopes can be reduced and the signal pulses can be widened.

Increasing the steepness of the edges and widening the signal pulses can be readily realized in the transmission of digital signals, an additional advantage being the elimination of cross-talk. The accompanying time delays can simply be compensated for in the control.

FIG. 4 shows the connection path shown in FIG. 2 in an embodiment which is suitable for the transmission of digital signals from a receive transmission line to a send transmission line. The control of the crosspoints is effected in the same manner and by the same means (decoders and address stores) as in FIG. 2. In FIG. 4 the parts corresponding with FIG. 2 are denoted by the same reference signs. The digital signals have the form of a one-bit pulse code modulation or delta modulations signal, one bit being transmitted in each frame time interval.

Connected to the clock pulse outputs *ca*, *cb* and *cc* of the central clock are the NOT-elements 400, 401 and 402 for generating the inverted clock pulses $\overline{ca}$, $\overline{cb}$ and $\overline{cc}$. The clock pulses and the inverted clock pulses are assumed to have a pulse duration amounting to 50 percent of the clock pulse period. The clock pulse periods of the clock pulses *ca*, *cb*, *cc* and *cd* are represented hereinafter by *Pa*, *Pb*, *Pc* and *Pd*.

The system shown in FIG. 4 for establishing a connection on the basis of the numbers stored in the registers 212, - - - , 219 according to Table 1, is identical to the corresponding system shown in FIG. 2 with the exception of a few additions. As an example will be considered the establishment of a time-derived connection characterized by the numbers $x$, $y$ and $z$ via the physical connection path shown in FIG. 4.

Like in FIG. 2, in the system shown in FIG. 4 the output of comparison unit 220 is connected directly to AND-gate 231 of group unit 103–0. Between the output of comparison unit 220 and the AND-gate 234 of the group unit 124–0 shown in FIG. 4, two cascade-connected one-bit shift register stages 427 and 428 are connected which are controlled by the clock pulses *cc*. The output signal of stage 428 has a delay of $2.P_c$ which respect to the output signal of comparison unit 220. The first result is that the number of register 212 is stored in the store location of the address store 106, the main time interval number of which is the same as the number $x$ stored in the register 215, i.e. store location $x$. The second result is that the number of register 219 is stored in the store location of address store 126, the main time interval number of which is two higher than the number stored in register 215, i.e. store location $x+2$. In FIG. 4 the already mentioned one-bit shift register stage 417 is connected between the output of comparison unit 220 and the AND-gate 223. Like in FIG. 2, the output of AND-gate 223 is connected directly to the AND-gate 226 of main group unit 102–0. but unlike in FIG. 2 is connected to the AND-gate 228 of main group unit 118–0 via the cascade-connection of the one-but shift register stages 429 and 430. The latter are controlled by the clock pulses *cb* and cause a delay of the output signal of AND-gate 223 amounting to $2.P_b$. The signal supplied to AND-gate 226 has a delay of Pc with respect to the corresponding signal of FIG. 2 and the signal supplied to AND-gate 228 has a delay of Pc+2*Pb* with respect to the corresponding signal of FIG. 2. The first result is that the number of register 213 is stored in the store location of address store 110, the main time interval number of which is one higher than the number stored in register 215 and of which the sub-time interval number is the same as the number stored in register 216, i.e. store location $x+1$, $y$. The second result is that the number of register 218 is stored in the store location of address store 122, the main time interval number of which is one higher than the number stored in register 215 and of which the sub-time interval number is two higher than the number stored in register 216, i.e. store location $x+1$, $y+2$.

In FIG. 4 the already mentioned one-bit shift register stage 429 is connected between the output of AND-gate 223 and AND-gate 224. The signal supplied to AND-gate 224 has a delay of Pc+Pb with respect to the corresponding signal of FIG. 2. The result is that the number of register 214 is stored in the location of address store 114, the main time interval number of which is one higher than the number stored in register 215, the sub-time interval number of which is one higher than the number stored in register 216 and the elementary time interval number of which is the same as the number stored in register 217, i.e. store location $x+1, y+1, z$.

In the example $z=0$.

In the case of FIG. 4, the time-derived connection characterized by the numbers $x$, $y$ and $z$ extends via the time channels:

| | |
|---|---|
| AB-channel | $x$ |
| BC-channel | $x+1, y$ |
| CD-channel | $x+1, y+1, z$ |
| DE-channel | $x+1, y+2$ |
| EF-channel | $x+2$. |

The following description refers to the transmission of one bit via the physical connection path shown in FIG. 4, via which a time-derived connection characterized by the numbers $x$, $y$ and $z$ ($z=0$) is established.

The connection path shown in FIG. 4 comprises the elements stated in the below table. The table states for each element the delay of the instant at which the bit starts at the output of the element with respect to the instant at which the bit starts at the output of the element 403.

The element marked * are the elements which are controlled by the decoders 107, 111, 115, 123 and 127.

TABLE 5

| element | delay |
|---|---|
| 403 | o |
| * 404 | $x.P_c$ |
| 405 | $(x+1).P_c$ |
| * 406 | $(x+1).Pc+y.P_b$ |
| 407 | $(x+1).Pc+(y+1).Pb$ |
| * 408 | $(x+1).Pc+(y+1).Pb+z.Pa$ |
| 409 | $(x+1).Pc+(y+1).Pb+z.\ Pa+Pa/2$ |
| 410 | $(x+1).Pc+(y+1).Pb+(z+1).Pa$ |
| 411 | $(x+1).Pc+(y+2).Pb+Pa/2$ |
| 413 | $(x+1).Pc+(y+2).Pb+Pb/2$ |
| * 414 | $(x+1).Pc+(y+3).Pb$ |
| 415 | $(x+2).Pc+2.Pb+Pb/2$ |
| 419 | $(x+2).Pc+Pc/2$ |
| * 420 | $(x+3).Pc$ |
| 421 | $Pd+2.Pc+Pc/2$ |
| 425 | $2.Pd$ |

With the exception of the elements 404, 406 and 408, each element of the transmission path is formed by a one-bit shift register stage which will hereinafter be referred to as register stage for the sake of brevity. After a change-over from 1 to 0 of the logical voltage level on the clock input, a register stage of this kind will present a logic voltage level on the output which corresponds to the logical voltage level of the input before this change-over occurred. In all register stages of the transmission path the change-overs from 1 to 0 occur some time after the logical voltage level on the input has been set in accordance with the value of the bit by the preceding register stage.

The elements 404, 406 and 408 are AND-gates. These elements have a selection function. The elements 410, 414 and 420 also have, in addition to a regeneration function, a selection function. The elements 411 and 413 and the elements 415 and 419 have the function of mutually synchronizing the time channels of the intermediate high-ways departing from the relevant demultiplexer, and synchronizing them with the time channels of the demultiplexers connected to the other ends of the intermediate highways. The elements 421 and 425 have a corresponding function with respect to the send transmission lines.

The bit of the receive transmission line 100–0–0–0 is received by a register stage 403 of crosspoint KAO which is controlled by the clock pulses *cd*. The output of register stage 403 is connected to an input of an AND-gate 404, the output of which is connected to the AB-intermediate highway 105–0. The control input of the crosspoint KAO is formed by a second input of AND-gate 404. The AND-gate 404 is controlled in the conducting state in the channel interval of the AB-channel $x$. The bit is thus delayed by $x.Pc$. The bit duration is equal to Pc.

The bit is received via the AB-intermediate high-way 105–0 by a register stage 405 of crosspoint KBO, which is controlled by the clock pulses *cc*. This register stage adds a delay of Pc to the bit. The bit duration is still equal to Pc. The output of register stage 405 is connected to an input of an AND-gate 406, the output of which is connected to the BC-intermediate highway 109–0. The control input of the crosspoint KBO is formed by a second input of AND-gate 406. AND-gate 406 is controlled in the conducting state in the channel interval of the BC-channel $x+1$, $y$ and adds to the bit a delay of $y.Pb$. The bit duration is equal to P*b*.

Via the BC-intermediate highway 109–0 the bit is received by a register stage 407 of crosspoint KCO, which is controlled by the clock pulses *cd*. This register stage adds a delay of Pb to the bit. The bit duration is still equal to P*b*. The output of register stage 407 is connected to an input of an AND-gate 408, the output of which is connected to the CD-intermediate highway 113. The control input of the crosspoint KCO is formed by a second input of AND-gate 408. AND-gate 408 is controlled in the conducting stage in the channel interval of the CD channel $X+1$, $y+1$, $z$ ($z=1$) and adds a delay of $z.P_a$ to the bit. The bit duration is equal to P*a*.

Subsequently, the bit is regenerated by a register stage 409 which is connected in the CD-intermediate highway 113 and which is controlled by the inverted clock pulses $\overline{ca}$. This register stage adds a delay of P*a*/2 to the bit. The bit duration of the regenerated bit is still equal to P*a*.

Via the CD-intermediate highway 113 the regenerated bit is supplied to a register stage 410 of crosspoint KBO, the clock input of which forms the control input of the crosspoint. In the channel interval of the CD channel $x+1$, $y+1$, $z$ ($z\times0$) the logical voltage level 1 is supplied to the control input of crosspoint KDO. As a result, the bit is presented on the output of register stage 410 from the end of the last-mentioned channel interval to the end of the channel interval of CD channel $x+1$, $y+2$, $z$ ($z\times0$). This register stage adds a delay of P*a*/2 to the bit. The bit of register stage 410 is received by a register stage 411, which is also associated with crosspoint KDO and which is controlled by the clock pulses *cb* after the latter have been subjected to a delay of P*a*/2in the register stage 412. The multiple sign shown in the line connecting the output of register stage 412 to the clock input of register stage 411 symbolizes the connections between register stage 412 and the other crosspoints of the D-demultiplexer. The register stage 411 fixes the starting instant of the bit, independent from the value of $z$, at the middle of the elementary time interval 0 of the sub-time interval $y+2$. As a result, register stage 411 adds a delay of $Pb-(zaz1).Pa+Pa/2$ to the bit. The bit of register stage 411 is received by the register stage 413, which is also associated with crosspoint KDO and which is controlled by the inverted clock pulses $\overline{cb}$. This register stage fixes the starting instant of the bit at the middle of the sub-time interval $y+2$ and adds a delay of $pb/2-P_a/2$. The bit duration on the outputs of the register stages 410, 411 and 413 is equal to P*b*. The output of register stage 413 is connected to the intermediate highway 117–0.

The bit is supplied via intermediate highway 117–0 to a register stage 414 of crosspoint KEO, the clock input of which is connected to the output of an AND-gate 426. The clock pulses *cb* are supplied to an input of AND-gate 426. A second input of AND-gate 426 forms the control input of the crosspoint KEO. In the channel interval of the DE-channel $x+1$, $y+2$, the logical $y$=level 1 is supplied to the control input of crosspoint KEO. As a result, the bit is presented on the output of register stage 414 from the end of the last-mentioned channel interval. This register stage adds a delay of Pb/2 to the bit.

The bit duration on the output of register stage 414 depends on the instant at which the logical voltage level of the clock input of register stage 414 changes again from 1 to 0 This instant cannot occur earlier than at the end of the channel interval of the DE-channel $x+2$, 2 of another time-derived connection characterized by the numbers $x+1$, $y=0$ and $z=0$. The bit duration is then at least equal to $P_c-y.P_b$.

In the special case that in the present example $y=7$, the control input of crosspoint KEO will have the logical voltage level 1 in the channel interval of DE-channel $x+2$, 1. If the DE-channel $X+2$, 2 is also used for another time-derived connection via this crosspoint, the control input of the crosspoint also has the logical voltage level 1 in the channel interval of this channel. The channel intervals of these two time channels adjoin, so that the change-over of the logical voltage level of the clock input from 1 to 0, necessary for shifting the bit through register stage 414, is lacking on the decoder output. Under the control of the clock pulses *cb*, the AND.gate 426 ensures that under all circumstances the desired level change-over is produced. The bit of register stage 414 is received by the register stage 415, which is also associated with the crosspoint KEO and which is controlled by the clock pulses *cc* after the latter have been subjected to a delay of $2.P_b+P_b/2$ in the cascade connection of the register stages 416, 417 and 418. Register stage 415 fixes the starting instant of the bit, independent from the value of $y$, at the middle of the sub-time interval 2 of the main time interval $x+1$. Consequently, register 415 adds a delay of $Po-(y+3).Pb+:Pb+Pb/2$ to the bit. The bit of register stage 415 is received by the register stage 419 which is also associated with the crosspoint KEO and which is controlled by the inverted clock pulses $\overline{cc}$. This register stage fixes the starting instant of the bit at the middle of the main time interval $x+1$ and adds a delay of $P_c-2P_b-P_b/2$. The bit duration of the outputs of the registers stages 415 and 419 is equal to the duration of one main time interval. The output of register stage 419 is connected to the intermediate highway 121–0.

The bit is supplied via intermediate highway 121–0 to a register stage 420 of crosspoint KFP. The clock input of register stage 420 forms the control input of crosspoint KFP. In the channel interval of the EF-channel $x+2$ the logical voltage level 1 is supplied to the control input of the crosspoint KFP. As a result, the bit presented on the output of register stage 420 from the end of the last-mentioned channel interval to the end of the first-following channel interval of the same channel. This register stage adds a delay of P*c*/2. The bit of register stage 420 is received by the register stage 421 which is also associated with the crosspoint KFP and which is controlled by the clock pulses *cd* after the latter have been subjected to a delay of 2.P*c*+P*c*/2 in the cascade connection of the register stages 422, 423 and 424. Register stage 421 fixes the starting instant of the bit, independent from the value of $x$, at the middle of the main time interval 2 of a frame time interval. As a result, register stage 421 adds a delay of $P_d-(x+3).P_c+2.P_c+P_c/2$. The bit of register stage 421 is received by the register stage 425 which is also associated with crosspoint KFP and which is controlled by the clock pulses *cd*. This register stage fixes the starting instant of the bit at the beginning of the frame time interval and adds a delay of $Pd-2P_c-P_c/2$ to the bit. The bit duration on the outputs of the register stages 420, 421 and 425 is equal to the duration of one frame time interval. The output of register stage 425 is connected to the send transmission line 101–0–0–P which receives the bit from the receive transmission line 100–0–0–0 with a total delay of two frame time intervals (2.P*d*). The elements 421 to 425 can be omitted in the case that a time delay depending upon the connection is permitted.

In the case of symmetrical four-wire connections, the control of the crosspoints in the embodiment shown in FIG. 4 can be simplified in the same manner as is illustrated in FIG. 3 for the crosspoints in the embodiment shown in FIG. 2.

In the case of FIG. 4, a time-derived connection characterized by the numbers $x$, $y$ and $z$ extends via the time channels:

| | |
|---|---|
| AB-channel | $x$ |
| BC-channel | $x+1, y$ |
| CD-channel | $x+1, y+1, z$ |
| DE-channel | $x+1, y+2$ |
| EF-channel | $x+2$ |

If a delay unit causing a delay of $u$ main time intervals is connected in the CD-intermediate highway 113, the go-connection path characterized by the numbers $x$, $y$ and $z_2$ extends via the time channels:

| | |
|---|---|
| AB-channel | $x$ |
| BC-channel | $x+1, y$ |
| CD-channel | $x+1, y+1, z_2$ |
| (after the delay) | $x+u+1, y+1, z_2$ |
| DE-channel | $x+u+1, y+2$ |
| EF-channel | $X+u+2$ |

and the return-connection path characterized by the numbers $x+8$, $y$ and $z_1$ extend via the time channels:

| | |
|---|---|
| AB-channel | $x+8$ |
| BC-channel | $x+8+1, y$ |
| CD-channel | $x+8+1, y+1, z_2$ |
| (after the delay) | $x+u+8+1, y+1, z_2$ |
| DE-channel | $x+u+8+1, y+2$ |
| EF-channel | $x+u+8+2$ |

The additional delay of $u$ main time intervals can be compensated for in the F-demultiplexer by adding $u$ register stages to the register stages 422, 423 and 424.

In order to establish a symmetrical four-wire connection, the following operations must have taken place, for which purpose use can be made in two phases of the portion of the system shown in FIG. 4 which is used for storing the numbers in the address stores of the A, B and CD-switching stages:

1. the line number of the A-transmission path has been stored in the location $x$ of the address store of the relevant group unit.
2. the line number of the B-transmission path has been stored in the store location $x+8$ of the address store of the relevant group unit:
3. the group number of the A-transmission path has been stored in the store location $x+1$, $y$ of the address store of the relevant main group unit
4. the group number of the B-transmission path has been stored in the store location $x+8+1$, $y$ of the address store of the relevant main group unit.
5. the main group number of the A-transmission path has been stored in the store location $x+1$, $y+1$, $z_2$ of the address store 114.
6. the main group number of the B-transmission path has been stored in the store location $x+8+1$, $y+1$, $z_1$ of the address store 114.

In the case of FIG. 4, instead of the delay unit 301 shown in FIG. 3, a delay unit causing a delay of $u+8+2$ main time intervals is to be used. As a result, store location $x$ of the address store of each receive group unit, which is associated with AB-channel $x$, is also associated with the EF-channel $x+u+8+2$ of the corresponding send group unit, and the store location $x+8$, which is associated with AB-channel $x+8$, is also associated with the EF-channel $x+8+u+8+2$ + $x+u+2$ of the corresponding send group unit.

Instead of the delay unit 302 shown in FIG. 3, in the case of FIG. 4 a delay unit is to be used which causes a delay of $u+8$ main time intervals and 2 sub-time intervals. As a result, store location $x+1$, $y$ of the address store of each receive main group unit, which is associated with BC-channel $x+1$, $y$, is also associated with the DE-channel $x+u+8+1$, $y+2$ of the corresponding send main group unit, and the store location $x+8+1$, $y$, which is associated with BC-channel $x+8+1$, $y$, is also associated with the DE-channel $x+u+8+8+1$, $y+2$ = $x+u+1$, $y+2$ of the corresponding send main group unit.

The result of the operations mentioned in the above points 1., 3. and 5. is the establishment of the first portion of the go-connection path and the last portion of the return-connection path. The result of the operations mentioned in the above points 2., 4. and 6. is the establishment of the first portion of the return-connection path and the last portion of the go-connection path.

If $u = 6$ is chosen, the delay unit corresponding to the delay unit 301 shown in FIG. 3 causes a delay of 6+8+2 = 16 main time intervals or one frame time interval, so that it can be omitted.

In this case the decoder 107 of each receive group unit can be combined with the decoder 123 of the corresponding send group unit to form one decoder which controls both the crosspoints of the A-multiplexer and the crosspoints of the F-demultiplexer. This offers a considerable saving in equipment.

If $u=6$ is chosen, the delay unit corresponding to delay unit 302 causes a delay of 6+8=14 main time intervals and 2 sub-time intervals ($14.P_c+2.P_b$). If one frame time interval ($P_d=16P_c$) is subtracted therefrom, a delay of $-2Pc+2Pb$ remains. This delay has a negative sign and can be realized by branching off the shift register of the address store of the receiver main group unit at such a place that the delay between this place and the output is equal to $2Pc-2Pb$. This branch is than connected to the decoder of the E-demultiplexer of the corresponding send main group unit.

What is claimed is:

1. A telecommunication system with time division multiplex, comprising receive transmission lines and send transmission lines and a clock for generating a time scale which is divided into mutually equal frame time intervals, each of which is divided into $k$ mutually equal main time intervals, the receive transmission lines being divided into groups and each group being connected to an adjustable first-order multiplexer which is controlled by a cyclic address store having $k$ store locations in each of which a variable address can be stored, for establishing in each frame time interval a signal transfer from each receive transmission line of the group to a receive group intermediate highway in a main time interval selectively associated with the receive transmission line and having the same relative position in each frame time interval, the send transmission lines being divided into groups and each group being connected to an adjustable first-order demultiplexer which is controlled by a cyclic address store having $k$ store locations, in each of which a variable address can be stored for establishing in each frame time interval a signal transfer from a send group intermediate highway to each send transmission line of the group in a main time interval selectively associated with the send transmission line and having the same relative position in each frame time interval, characterized in that each of the main time intervals is divided into $m$ mutually equal sub-time intervals, the receive group intermediate highways being divided into main groups and each main group being connected to an adjustable second-order multiplexer which is controlled by a cyclic address store having $k.m$ store locations, in each of which a variable address can be stored for establishing in each main time interval a signal transfer from each receive group intermediate highway of the main group to a receive main group intermediate highway in a sub-time interval selectively associated with the receive group intermediate highway and having the same relative position in each frame time interval, the send group intermediate highways being divided into main groups and each main group being connected to an adjustable second-order demultiplexer which is controlled by a cyclic address store having $k.m$ store locations, in each of which a variable address can be stored for establishing in each main time interval a signal transfer from a send main group intermediate high-way to each send group intermediate highway of the main group in a sub-time interval selectively associated with the send group intermediate highway and having the same relative position in each frame time interval, a switching network being provided for connecting the receive main group intermediate highways to the send main group intermediate highways.

2. A telecommunications system as claimed in claim 1, characterized in that each sub-time interval is divided into $n$ mutually equal elementary time intervals, the receive main group intermediate highways being connected to an adjustable third-order multiplexer and the send main group intermediate highway being connected to a third-order demultiplexer, the third-order multiplexer being connected via a central intermediate highway to the third-order demultiplexer, the third-order multiplexer being controlled by a cyclic address store having *k.m.n.* store locations, in each of which a variable address can be stored for establishing in each sub-time interval a signal transfer from each receive main group intermediate highway to the central intermediate highway in an elementary time interval selectively associated with the receive main group intermediate highway and having the same relative position in each frame time interval, the third-order demultiplexer being controlled by a cyclic modulo-*n* elementary time interval counter for establishing in each sub-time interval a signal transfer from the central intermediate highway to each send main group intermediate highway in an elementary time interval which is permanently associated with the send main group intermediate highway.

3. A telecommunication system as claimed in claim 2, characterized in that the demultiplexers comprise pulse-wideners controlled by clock pulses.

4. A telecommunication system as claimed in claim 2, characterized in that each first-order multiplexer and the corresponding first-order demultiplexer are controlled by a common address store having *k* store locations, each second-order multiplexer and the corresponding second-order demultiplexer being controlled by a common address store having *k-m.* store locations.

5. A telecommunication system as claimed in claim 4, characterized in that each first-order multiplexer and the corresponding first-order demultiplexer are connected to a common decoder which is controlled by the said common address store having *k* store locations.

* * * * *